UNITED STATES PATENT OFFICE 2,201,367

COLORING ACETATE ARTIFICIAL SILK

William John Grubb, Cecil Shaw, and Reginald Harold Sennett, Blackley, Manchester, England, assignors to Imperial Chemical Industries Limited, a corporation of Great Britain No Drawing. Application September 14, 1938, Serial No. 229,974. In Great Britain September 19, 1937

2 Claims. (Cl. 8—40)

As is well known, acetate artificial silk when first introduced presented many difficulties in dyeing. These difficulties have to a large extent since been overcome by the discovery of new dyeing processes and new dyestuffs. Among the new dyestuffs there are various derivatives of anthraquinones, in which the anthraquinone carries as substituents one or more amino groups or substituted amino groups. Among the derivatives of anthraquinone there are to be found the majority of the fastest acetate artificial silk dyestuffs at present on the market. However, while it has not been difficult to obtain such derivatives which dye in shades of yellow, orange, red, red-blue, blue and the like, there has been great difficulty in obtaining derivatives which dye in black shades, and there is still a lack of satisfactory black dyestuffs for acetate artificial silk. This lack has been met in part, by using mixtures, but this device is unsuitable for many purposes, for instance, it is less convenient to use two or more dyestuffs instead of a single dyestuff, and also a mixed dyestuff may not always behave as a homogeneous product under all the conditions of use.

We have now found that the dyestuff of formula

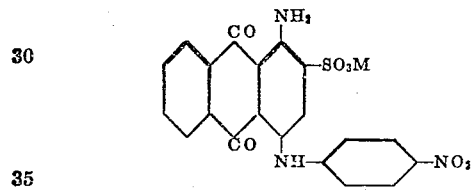

where M stands for an atom or radical yielding a soluble compound, for instance, hydrogen, sodium, potassium or ammonium, will dye acetate artificial silk in black shades, which have very good fastness to light and good fastness to washing, acids and alkalies.

The dyestuff will easily give deep shades, and also has the advantage that it is soluble in water. Altogether, its properties are such that it is suitable for use in dyeing in conjunction with the best yellow to blue acetate artificial silk dyestuffs, and accordingly it is a very valuable acetate artificial silk dyestuff. While the black shades which are obtained have a greenish tinge, the shades are properly described as blacks. Black shades with a reddish tinge may be readily obtained by the use along with the aforementioned dyestuff of a small proportion of a fast water-soluble red acetate artificial silk dyestuff. Bottle-green shade dyeings may be obtained by using only a small quantity of dyestuff.

An object of the present invention is to furnish a process for dyeing acetate artificial silk which comprises the application thereto from an aqueous bath of a dyestuff of the formula

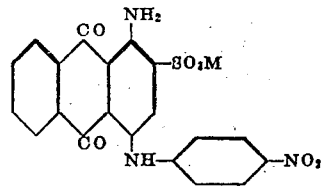

where M stands for an atom or radical yielding a soluble compound, for instance, hydrogen, sodium, potassium or ammonium.

A further object of the invention is the production of acetate artificial silk which has been dyed with the above mentioned dyestuff.

The dyestuff may be used either as free sulphonic acid, or as soluble salt thereof, e. g. as the sodium salt, potassium or ammonium. As already stated it is soluble in water, and consequently it may be used without first submitting it to a process such as a solubilising process so as to ensure its presence in the dyebath in a sufficiently high degree of dispersion. The dyeing from an aqueous bath may be effected in the way customary for aminoanthraquinone acetate artificial silk dyestuffs, namely, by working first warm and then at 80–85° C. A small proportion of a soluble salt, e. g. sodium chloride can conveniently be added to the dyebath to give good exhaustion.

1-amino-4-p-nitroanilinoanthraquinone-2-sulfonic acid may be conveniently made as described in German patent Specification No. 624,501, where the compound is described, being there made by a process in which the first step comprises dissolving 1-amino-4-anilinoanthraquinone-2-sulfonic acid in cold 96% sulfuric acid and adding trioxymethylene (formaldehyde). The formaldehyde is said to protect the amino group. We have found that when 1-amino-4-anilinoanthraquinone-2-sulfonic acid is treated with formaldehyde in hot sulfuric acid solution as described in British Specification No. 441,845 and then nuclear condensation to give a diphenyl methane derivative there described does in fact take place, and when the product obtained is treated with a nitrating agent as described in British Specification No. 419,990 it gives as there described, a dyestuff which however is not the compound 1-amino-4-p-nitroanilinoanthraquinone-2-sulfonic acid. Our investigations confirm the statement in German Specification No. 624,581 that the amino group is protected. Further we have found that when working according to the directions in German Specification No. 624,581 we can separate by diluting the sulfuric acid solution at the end of the step mentioned above, a compound which appears to be a Schiffs' base, i. e. to contain the group —N=CH₂, which is seemingly the compound which is nitrated, with simultaneous or subsequent replacement of the methylene group by hydrogen.

The following examples in which parts are by weight, illustrate but do not limit the invention.

*Example 1*

8 parts of 1-amino-4-p-nitroanilinoanthraquinone-2-sulfonic acid are added to 3000 parts of water. 100 parts of acetate artificial silk yarn are scoured in a warm very dilute solution of soap and ammonia, washed in cold water and entered into the dye-bath. The temperature is raised slowly to 80° C. 40 parts of sodium chloride is added, and the dye-bath is then kept at 80-85° C. for ¾ hour, the yarn being turned in the dye liquor continuously. The yarn is then removed from the dye-bath, washed in cold water and dried. A deep greenish-black dyeing is obtained.

*Example 2*

This is the same as Example 1 but 4 parts of the sodium salt of 1-amino-4-p-nitroanilinoanthraquinone-2-sulfonic acid and 0.5 part of the azo dyestuff o-chloro-p-nitroaniline→N-ethyl-N-β-sulfatoethylaniline are used instead of the 8 parts of the compound of Example 1. A neutral black dyeing is obtained.

We claim:

1. Process for dyeing acetate artificial silk which comprises the application thereto from an aqueous bath of the dyestuff of the formula

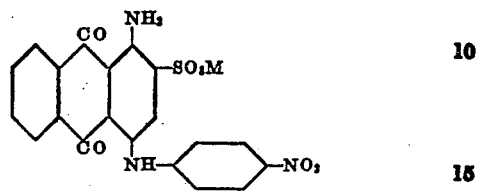

where M stands for an atom or radical yielding a soluble compound, for instance hydrogen, sodium, potassium or ammonium.

2. Acetate artificial silk dye by the dyestuff of the formula

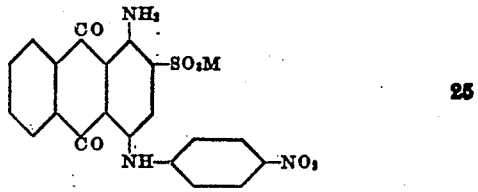

where M stands for an atom or radical yielding a soluble compound, for instance hydrogen, sodium, potassium or ammonium.

WILLIAM JOHN GRUBB.
CECIL SHAW.
REGINALD HAROLD SENNETT.

CERTIFICATE OF CORRECTION.

Patent No. 2,201,367. May 21, 1940.

WILLIAM JOHN GRUBB, ET AL.

It is hereby certified that error appears in the printed specification of the above numbered patent requiring correction as follows: Page 2, second column, line 20, claim 2, for the word "dye" read --dyed--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.